United States Patent [19]
Ingham et al.

[11] 3,921,993
[45] Nov. 25, 1975

[54] COLLET CHUCKING ASSEMBLY

[75] Inventors: John Milton Ingham, North Kingstown; Lloyd Frederick Reslow, East Greenwich, both of R.I.

[73] Assignee: Brown & Sharpe Manufacturing Company, North Kingstown, R.I.

[22] Filed: Aug. 31, 1972

[21] Appl. No.: 285,214

[52] U.S. Cl. ............................ 279/50; 279/2
[51] Int. Cl.² .......................... B23B 31/20
[58] Field of Search ............... 279/41–43, 279/50, 74, 122, 2

[56] References Cited
UNITED STATES PATENTS

| | | | |
|---|---|---|---|
| 1,867,266 | 7/1932 | Johnson et al. | 279/2 |
| 2,494,764 | 1/1950 | Jurisinovic | 279/50 |
| 2,984,493 | 5/1961 | Lindemann | 279/2 |

*Primary Examiner*—Leonidas Vlachos
*Attorney, Agent, or Firm*—Barlow & Barlow

[57] ABSTRACT

A collet chucking assembly for gripping bar stock having a tubular spindle through which bar stock may be fed, separate front and rear chuck sleeves, separate front and rear collets, and a chuck nut that is screw tightened on the threaded end of the spindle. The rear chuck sleeve is slidably positioned within the threaded end of the spindle and the forward end of its bore tapered to mate with a tapered surface of the rear collet. A front chuck sleeve is slidably positioned within the spindle, one end engaging the rear collet, the forward end being tapered to mate with a tapered surface of the front collet. A chuck nut holds the collets within the spindle.

8 Claims, 2 Drawing Figures

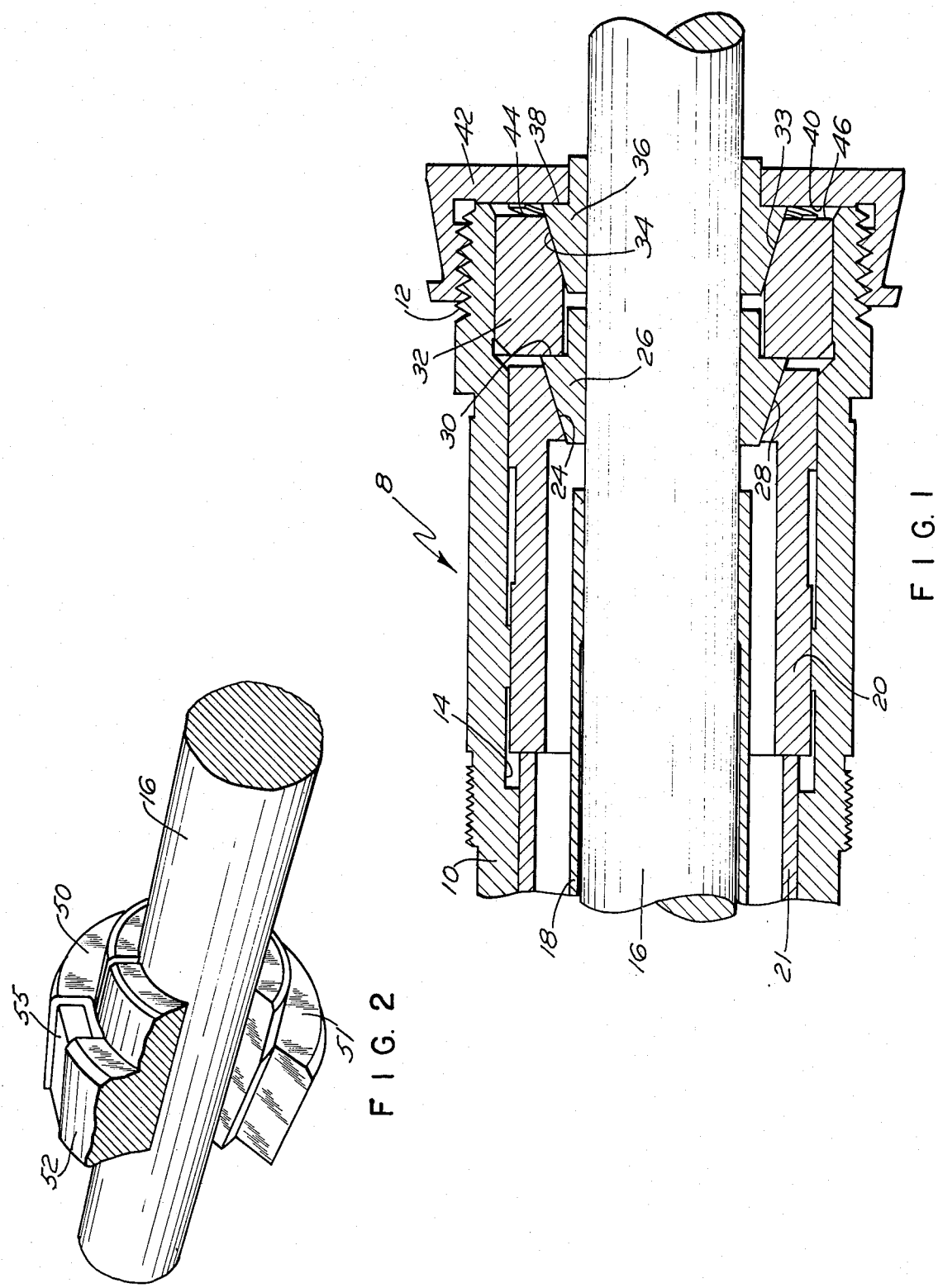

COLLET CHUCKING ASSEMBLY

BACKGROUND OF THE INVENTION

The invention relates to chucks of the collet type such as are used in screw machines, lathes, and other machine tools. In these chucks the bar stock is gripped and centered by simultaneously contracting the annularly spaced fingers of the collet against the external surface of the bar stock. Chuck assemblies utilizing collets which are constructed to center, secure and rotate a work piece to be machined or ground are extensively used, but the majority of these are subject to one objection or another. For instance, in some the collets are of the spring type whose annularly spaced fingers can only close parallel on exact size stock because of back end hinge action of the fingers. On others, too much time may be lost in centering the work piece or in securing and removing the same. Also some do not provide a sufficient gripping force on the stock bar so that heavier form cuts cannot be made without chatter and heavier combined drilling and forming cannot be made without pushback of the bar stock through the spindle.

SUMMARY OF THE INVENTION

A piece of bar stock to be machined is inserted into the hollow spindle of the machine tool from the rear end thereof so that the forward or nose end of the bar stock pass through the feed finger assembly and the collets and protrudes from the collets so that at least a portion thereof is in position to be operated on by the tooling fixtures. In the present invention a pair of front and rear axially spaced collets are utilized, and a rear chucking sleeve engages the rear collet. The axial force transmitted by the rear chucking sleeve passes through the rear collet to the front chuck sleeve which engages the front collet so that both collets grip the bar stock. This operation is caused by the axial movement of the chuck closing tube, and after machining has occurred, the chuck closing tube will be released and a spring acting against the front chucking sleeve will move the parts axially, releasing the collets whose portions move radially outward as resilient means are provided between the sections thereof. In the form of the present invention, the double chucking assembly will increase the spring constant of the combined structure of the bar stock and the spindle which will allow heavier form cuts without stock chatter and an increased axial force to avoid stock pushback.

It is an object of the invention to provide a collet chucking assembly that gives nearly double the gripping strength of a single collet chuck on bar stock being held.

It is an object of the invention to provide a collet chucking assembly capable of utilizing collets of a relatively short longitudinal dimension.

It is also an object of the invention to provide a collet chucking assembly that utilizes a plurality of identical collets.

It is a further object of the invention to provide a collet chucking assembly that can eliminate chatter when heavier form cuts are made and which can also eliminate pushback of the bar stock when heavier combined drilling and forming operations are done on the bar stock.

It is an additional object of the invention to provide a collet chucking assembly comprised of minimal parts and one that is more economical to manufacture.

DESCRIPTION OF THE DRAWINGS

FIG. 1 is a cross section view of the assembled collet chucking assembly; and

FIG. 2 is a perspective view of one of the collets positioned on a piece of bar stock and having a portion of its structure broken away.

DESCRIPTION OF THE PREFERRED EMBODIMENT

Referring to FIG. 1, the collet chucking assembly will be described. The collet chucking assembly is generally designated numeral 8, and spindle 10 of the assembly would be supported by a machine such as a bar fed screw machine. At one end of spindle 10 are formed screw threads 12, and this end will be referred to henceforth as the forward end of the spindle. The spindle is tubular and has a bore 14. A piece of bar stock 16 is illustrated as being held within the collet chucking assembly as it would appear during machining operations on the bar stock. A feeding finger 18 frictionally grips the stock bar, and it is used to control the axial movement of the bar stock through the spindle as one piece after another is machined from the bar stock.

Surrounding the stock bar is a rear chuck sleeve 20 that is slidably positioned within the threaded end of spindle 10, and it has portions of its radial outer surface in contact with the inner radial bore surface of the spindle. Forward movement of the sleeve is caused by chuck closing tube 21 that reciprocates, as known in the art, which tube abuts sleeve 20. The forward end of the rear chuck sleeve 20 has an outwardly tapered bore section 24 that matingly presses against the frusto-conical surface 28 of the rear segmented collet 26. The rear collet 26 resiliently grips the bar stock passing through its bore. The structure of the segmented collets will be discussed later on. The forward section of collet 26 has a reduced diameter forming an annular shoulder or abutment portion 30 that faces toward the forward end of the spindle. Within this shouldered area is nested a front chuck sleeve 32. The shoulder 30 of rear collet 26 bears against front chuck sleeve 32. Front chuck sleeve 32 has at its forward end an outwardly tapered bore section 33 that bears against the frusto-conical surface 34 of front segmented collet 36. Collets 26 and 36 are identical and grip the stock bar 16 in the same manner which nearly doubles the gripping force. Front collet 36 has an annular shoulder 38 similar to shoulder 30, and it abuts against the rear wall 40 of chuck nut or spindle closure means 42. also bearing against rear wall 40 is annular wave spring 44 that also bears against the forward wall surface 46 of the front chuck sleeve. The wave spring between the front chuck sleeve and nut forces the chuck sleeve rearwardly of the spindle to assist in opening the collet 36.

The segmented collets utilized in the described collet chucking assembly 8 are better understood by referring to FIG. 2. There it is shown that the collets are each formed from a plurality of arcuate metal segments 50, 51, and 52. These segments are attached to each other along their longitudinal surfaces by flexible elastomeric material 55 that is bonded to the metal and which serves as springs to release the gripping action of the collet on the stock bar once the compressive forces against the outer radial surfaces of the collet have been removed or lessened. This type of collet is far superior to the spring type of collets because they can close parallel to a range of stock diameters, thereby eliminating the expense of stocking and maintenance of collets in your normal in-between sizes. These segmented collets have a range +0.005 inch to −0.010 inches, thereby making it unnecessary to have special and decimal size collets for stock sizes within the range. The segmented collets when tested for individual collet gripping power give up to 36 percent greater gripping power when holding bar stock. Additionally since the longitudinal dimension of the collet is smaller than the outer diameter dimension of the collet, the axial spacing of the collet in the chucking assembly is kept to a minimum and this allows the bar remnant that remains after the stock bar has been machined to be kept short and to a minimum size. The segmented collets also improve the machining accuracy on the bar stock pieces since the segmented collet holds the bar stock more concentrically.

What is claimed is:

1. A collet chucking assembly comprising a tubular spindle, a rear chuck sleeve slidably positioned within the spindle, a rear collet having a tapered external surface thereon and an abutment portion, said rear chuck sleeve having a mating tapered surface, a front chuck sleeve having a tapered surface thereon and a front collet having a tapered surface thereon, said front chuck sleeve engaging said abutment portion of said rear collet, means retaining said front collet within said spindle whereby when said rear chuck sleeve is moved axially into engagement with said rear collet force is transmitted through the front chuck sleeve to the front collet to close both collets about a work piece.

2. A collet chucking assembly for gripping bar stock comprising a tubular spindle through which bar stock may be fed, said spindle having a foward end, a rear chuck sleeve slidably positioned within the forward end of said spindle, said rear chuck sleeve having the forward end of its bore tapered outwardly, a rear collet having a bore surface for resiliently gripping a piece of bar stock passed within it, said rear collet having frusto-conical surface that mates with the tapered forward end of the rear chuck sleeve, a front chuck sleeve slidably positioned within the forward end of said spindle forward of said rear collet, said front chuck sleeve having the forward end of its bore tapered outwardly, a front collet having a bore surface that resiliently grips a piece of bar stock passed within it, said front collet having a portion of its length formed with a frusto-conical surface that mates with the tapered forward end of the rear chuck sleeve, spindle closure means on the forward end of the spindle to retain the collets within said spindle.

3. A collet chucking assembly as recited in claim 2 wherein said front and rear collets are each comprised of arcuate metal segments that are attached to each other along their longitudinal surfaces by resilient means that allow the bore of the collets to be compressed inwardly to grippingly engage the outer surface of a piece of bar stock fed into the assembly.

4. A collet chucking assembly as recited in claim 3 wherein said resilient means is an elastomer that is bonded to said longitudinal surfaces.

5. A collet chucking assembly as recited in claim 2 wherein means are provided to cause axial movement of said rear chuck sleeve comprising a chuck closing tube whose forward surface bears against the rear surface of said rear chuck sleeve.

6. A collet chucking assembly as recited in claim 2 further comprising spring means between the forward surface of said front chuck sleeve and the spindle closure means that functions to assist in releasing the grip of the collets on a piece of bar stock.

7. A collet chucking assembly as recited in claim 2 wherein said rear collet has an outer annular shoulder against which the rear axial surface of said front chuck sleeve bears.

8. A collet chucking assembly as recited in claim 2 wherein said front collet has an outer annular shoulder against which the rear surface of said spindle closure means bears.

* * * * *